United States Patent
Chagnot (10) Patent No.: US 11,168,272 B2
(45) Date of Patent: Nov. 9, 2021

(54) MECHANICAL POWER SOURCE WITH BURNER

(71) Applicant: Catherine J. Chagnot, Athens, OH (US)

(72) Inventor: Catherine J. Chagnot, Athens, OH (US)

(*) Notice: Subject to any disclaimer, the term of this patent is extended or adjusted under 35 U.S.C. 154(b) by 11 days.

(21) Appl. No.: 16/720,996

(22) Filed: Dec. 19, 2019

(65) Prior Publication Data

US 2020/0123460 A1     Apr. 23, 2020

Related U.S. Application Data

(62) Division of application No. 15/715,947, filed on Sep. 26, 2017, now Pat. No. 10,577,550.

(51) Int. Cl.
| | | |
|---|---|---|
| *C10J 3/34* | (2006.01) | |
| *C10B 53/02* | (2006.01) | |
| *C10J 3/22* | (2006.01) | |
| *C10J 3/26* | (2006.01) | |
| *C10J 3/32* | (2006.01) | |
| *C10J 3/42* | (2006.01) | |

(52) U.S. Cl.
CPC ............ *C10J 3/34* (2013.01); *C10B 53/02* (2013.01); *C10J 3/22* (2013.01); *C10J 3/26* (2013.01); *C10J 3/32* (2013.01); *C10J 3/42* (2013.01); *C10J 2200/158* (2013.01); *C10J 2200/36* (2013.01); *C10J 2300/0906* (2013.01); *C10J 2300/0916* (2013.01); *C10J 2300/0956* (2013.01)

(58) Field of Classification Search
CPC ............ C10J 2300/0956; C10J 3/26; C10J 2200/158; C10J 3/34; C10J 3/42; C10J 3/36; C10J 3/40; C10J 3/30; C10J 2200/09
See application file for complete search history.

(56) References Cited

U.S. PATENT DOCUMENTS

| | | |
|---|---|---|
| 2,534,916 A | 12/1950 | King |
| 3,476,494 A | 11/1969 | Buchanan et al. |
| 3,889,744 A | 6/1975 | Hill et al. |
| 4,306,506 A | 12/1981 | Rotter |
| 4,649,283 A | 3/1987 | Berchowitz et al. |
| 4,659,340 A | 4/1987 | Weaver |

(Continued)

FOREIGN PATENT DOCUMENTS

| | | |
|---|---|---|
| GB | 2534916 A | 10/2016 |
| WO | 2010062987 A2 | 6/2010 |

OTHER PUBLICATIONS

Forestry Department, Wood Gas As Engine Fuel . . . , 2.5 Design of downdraught gasifiers, FAO Corporate Document Repository, pp. 1-7, http://www.fao.org/docrept/t0512e/T0512e0c.htm.

*Primary Examiner* — Imran Akram
(74) *Attorney, Agent, or Firm* — Frank H. Foster; Kremblas & Foster (57) ABSTRACT

The invention includes mixing gas or solid particulate fuel in a conduit segment that houses a mixing chamber. Fuel is fed through a fuel inlet port into the mixing chamber. High velocity combustion air from a blower is forced into the mixing chamber through a restricted orifice that generates a suction pressure for drawing gas or solid particulate fuel into the mixing chamber. A combustion chamber supply conduit delivers fuel from the mixing chamber into a burner.

7 Claims, 6 Drawing Sheets

(56) References Cited

U.S. PATENT DOCUMENTS

| | | | |
|---|---|---|---|
| 6,784,562 B2 | 8/2004 | Gennesseaux | |
| 6,830,597 B1 | 12/2004 | Green | |
| 9,416,326 B2 | 8/2016 | Paganessi et al. | |
| 2004/0261670 A1* | 12/2004 | Dueck | F23B 1/24 110/231 |
| 2005/0109603 A1* | 5/2005 | Graham | C10J 3/723 201/25 |
| 2010/0000224 A1 | 1/2010 | Cappello | |
| 2010/0071369 A1* | 3/2010 | Martin | F02C 6/18 60/680 |
| 2011/0162827 A1 | 7/2011 | Riley | |
| 2012/0017510 A1 | 1/2012 | Leveson | |
| 2012/0247374 A1* | 10/2012 | Bender | F23G 5/0276 110/186 |
| 2013/0256113 A1 | 10/2013 | Tumiatti et al. | |
| 2015/0233575 A1* | 8/2015 | Tsumagari | F23D 11/02 431/208 |
| 2015/0322857 A1* | 11/2015 | Ethier | F02C 7/06 290/2 |
| 2016/0230104 A1 | 8/2016 | Cheiky | |

* cited by examiner

MECHANICAL POWER SOURCE WITH BURNER

CROSS-REFERENCE TO RELATED APPLICATION

This application is a division of U.S. Non-provisional patent application Ser. No. 15/715,947 filed Sep. 26, 2017 and now U.S. Pat. No. 10,577,550.

BACKGROUND OF THE INVENTION

This invention relates to improvements in downdraft gasifiers and to improvements in burners that heat external combustion engines using gas or solid particulate fuel. The invention more specifically relates to power generation equipment that combines a mechanical power source in the form of an external combustion engine, such as a free-piston Stirling engine, with a downdraft gasifier that supplies fuel gas from multiple forms of biomass to a burner for powering an external combustion engine.

There has long been a need for relatively small power generation equipment that can generate power for operating mechanical devices, such as water pumps or electrical devices like lighting and electrical motors, using locally available fuels as energy sources. One of the most promising options is an external combustion engine which is heated by fuel gas produced from biomass, such as dried manure, or dried vegetation in the form of sawdust, rice husks, corn husks, weeds, grasses, wood, or other waste products. This option is advantageously implemented by a gasifier that generates fuel gas from biomass and supplies this fuel gas to the burner of a free-piston Stirling engine, although other external combustion engines can be used. The mechanical power output of such an external combustion engine can be connected to drive a mechanical load or an electrical alternator to supply power to electrical appliances.

Gasification is the process of producing energy by converting organic or fossil fuel based carbonaceous materials, through pyrolysis at high temperatures, into carbon monoxide, hydrogen, and carbon dioxide and has been practiced for two centuries. During both world wars, especially World War II, there was a need for fuel produced by gasification due to the shortage of petroleum. The downdraft gasifier was first popularized during World War II due to increased prices and demands for fuel, and the robust ability of the downdraft gasifier to supply fuel to an engine.

A prior art downdraft gasifier typically has a tubular, vertically oriented fire tube that surrounds a gasifier working chamber. Biomass is fed into the top of the working chamber and is processed as the biomass progresses downward through a series of processing zones. Resulting ash and biochar exit from the bottom of the fire tube into an ash collection receptacle. The processing zones are most commonly referred to as, in downward progression, the drying zone, the pyrolysis zone, the combustion zone and the reduction zone from which the ash and biochar is dropped into a collection receptacle. Gases that result from pyrolysis flow downward within the working chamber. Ambient air to support combustion is introduced into the combustion zone via ports or pipes through the fire tube sidewall at the level of the combustion zone.

Although the above terminology is adopted for describing the invention, there can be some variation from that terminology. Pyrolysis is sometimes defined as the thermal decomposition of the volatile components of organic material due to an indirect source of heat at temperatures of 200° C. to 760° C. in the absence of oxygen. Gasification has been defined as a similar process which occurs with limited oxygen at temperatures of 480° C. to 1650° C. In view of the facts that these temperature ranges overlap and that air moves downward through the biomass during operation of the gasifier it is likely that both pyrolysis and gasification occur. Because the terminology choice does not have any effect upon the invention, the term "pyrolysis" is used for consistency.

In order to maintain the proper downward gas flow direction through the working chamber, prior art downdraft gasifiers have a removable lid at the top end of the fire tube to prevent upward gas flow by convection through the working chamber and to limit air flow into the working chamber from the top while also permitting the lid to be temporarily removed at times for adding biomass into the working chamber. The fuel gas produced by pyrolysis passes from the bottom of the reduction zone through an outlet tube or other passageway that typically turns vertically upward and extends above the level of the ambient air intake so that proper gas flow direction is maintained by convection through the gasifier working chamber and the outlet tube.

Since all tars must pass through a hot bed of char in the downdraft configuration, tar levels in the produced fuel gas are lower than in an updraft gasifier. However, despite that advantage, these gasifiers were commonly operated for only short periods of time because long term operation for much more than two hours was difficult due to the amount of tar and other pollutants in the fuel gas which would accumulate and disrupt proper operation of the engine.

Presently, long term, continuous operation remains a problem because gasifier operation must be halted periodically due to the formation of tar. The best gasifiers currently available can be run for only approximately 20 hours. Another problem with current downdraft gasifiers is that they require a closure or lid at the top of the fire tube in order to limit the incoming air because the air flow through the fire tube is downward which is opposite the direction of air flow through the fire tube that would be expected from simple convection. Therefore, some means must be provided to maintain the downward gas flow through the gasifier. One means shown in the prior art is an outlet passageway that extends sufficiently above the combustion zone in the fire tube so that it functions like a chimney to draw gas downward through the fire tube and then upward through the outlet passageway. However, such an outlet passageway still requires a closure at the top of the fire tube that must be removed from time to time to refill biomass into the fire tube.

A wide diversity of biomass materials are available at different times and places for fueling the burner of an external combustion engine. Sometimes biomass is available in granular or pellet form. It would be desirable to provide a burner that allows such biomass particles to be fed directly into the burner and burns them efficiently.

It is, therefore, an object and purpose of the invention to provide gasifier improvements that allow long term continuous gasifier operation for several days.

A further object and purpose of the invention is to provide a power source that has improved combustion efficiency of fuel gas produced by a gasifier.

Yet another object and purpose of the invention is to improve the ease and convenience of operating a downdraft gasifier by eliminating the need for a closure at the top of the fire tube. Without the top closure biomass can be conveniently manually filled into the fire tube without removing a hot top closure and additionally an automatic biomass feeder can be installed thereby extending the time between periodic inspection and operation by an attendant.

Yet another object of the invention is to provide a burner that is capable of burning any of a wide variety of fuel including other combustible gaseous fuels such as propane, natural gas, or landfill gas, liquid fuels and also allows solid biomass particles to be fed directly into the burner without the need for converting them to fuel gas.

BRIEF SUMMARY OF THE INVENTION

In one aspect, the invention is a downdraft gasifier that has a rotatable auger extending principally through the reduction zone of the gasifier working chamber. The upper end of the auger is positioned approximately between the combustion zone and the reduction zone and extends downward through the reduction zone. The auger serves two functions: (1) temporarily holding and periodically moving biofuel through the gasifier during its operation and (2) supporting biofuel in the gasifier in the manner of a grate. A frusto-conical biomass grate is arranged around the top of the auger for funneling biomass onto the auger. The frusto-conical biomass grate is perforated for permitting the passage of gases while retaining the biomass. A guide tube surrounds the auger and has an open upper end in registration with the narrower lower end of the frusto-conical biomass grate.

In another aspect of the invention, gas from the gasifier or alternatively solid particulates, such as saw dust or rice husks, are mixed with combustion air and fed into a burner. The air and fuel are mixed in a conduit segment that houses a mixing chamber and has a fuel inlet port, a combustion air inlet port and a combustion chamber outlet port. Fuel is fed through the fuel inlet port into the mixing chamber. High velocity combustion air from a blower is forced into the mixing chamber through a restricted orifice that is adjacent the mixing chamber. This arrangement generates a suction pressure in the mixing chamber that draws gas or solid fuel into the mixing chamber. A combustion chamber supply conduit that is connected to the combustion chamber outlet port extends into the combustion chamber of the burner for delivery of the fuel/air mixture into the burner.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

FIGS. 1 through 4 illustrate an overview of an assembled biomass-fueled power source that incorporates an embodiment of the invention. The main components are a downdraft gasifier 10 having a fuel gas outlet that is connected through a fuel gas outlet conduit 12 to the combustion chamber of a burner 14 that applies heat to a free-piston Stirling engine 16. The fuel gas outlet conduit 12 has an outer layer of insulation to help maintain the hot temperature of incoming gases so that tar compounds will not condense on the interior walls of the outlet conduit 12. That prevents the build-up of a layer of tar that would reduce and eventually block passage of fuel gas through the fuel gas outlet conduit 12. The engine 16 provides mechanical power to an internally and integrally mounted alternator for generating electrical power. Stirling engines of this and other types are well known in the prior art and are commercially available. Some examples of external combustion engines that may be used are alpha, beta, and gamma Stirling engines, rotary Stirling engines, Fluidyne engines and Ringbom engines. An example of a suitable Stirling engine is a model ST-5 that is available from Stirling Technologies, Inc. of Athens, Ohio USA.

Fuel gas produced by the downdraft gasifier 10 flows into a mixing chamber within a conduit segment that is conveniently implemented in the form of a tee 18. Ambient air for supporting combustion in the burner 14 is forced under pressure by a blower 20 through a recuperator 22 and from the recuperator 22 through a combustion air conduit 24 into the mixing chamber within the tee 18. The recuperator 22 transfers heat from the outgoing gas products of combustion within the burner 14 into the incoming combustion air from the blower 20 thereby superheating the incoming combustion air. The superheated combustion air is mixed in the mixing chamber within the tee 18 and the mixture flows downward from the tee 18 through a fuel inlet pipe (not visible in FIGS. 1-4) into the combustion chamber within the burner 14. Preheating the combustion air and the fuel gas from the gasifier 10 by means of the recuperator 22 substantially improves the efficiency of the generation of heat from combustion in the combustion chamber.

Importantly, as will be described in more detail below, an orifice that forms a restriction in the combustion air flow path through the conduit 24 is positioned adjacent the mixing chamber that is within the tee 18 immediately before the combustion air enters the mixing chamber. The restrictive orifice causes a pressure reduction below atmospheric pressure in the mixing chamber. This pressure reduction draws or sucks fuel gas from the gasifier, or alternatively solid fuel particles from a hopper, out through fuel gas conduit 12.

Combustion gases exit the combustion chamber within burner 14 through the recuperator 24 and pass out of the recuperator 24 through an exhaust conduit 26. These exhaust gases are passed through a cyclonic separator 28 that removes particulates from the exhaust gases.

The terms "conduit" and "blower" are used to describe the preferred embodiment of the invention. The term "conduit" refers to a structure or a series of structures that have a passageway through a surrounding wall, such as a tube or pipe, for conveying gas through the passageway. The term "conduit" includes interposed fittings, such as elbows, tees, valves, manifolds and couplings, as well as passages through interposed devices, such as a recuperator, which together define a gas passage from a gas source to the destination for the gas conveyed through the conduit. The term "blower" is used to describe any of the many well-known devices, such as a centrifugal air pump, piston pump, or an air impeller driven by a motor, for pumping ambient air through a conduit at a pressure above ambient air pressure.

The Downdraft Gasifier

Figures 5, 6:
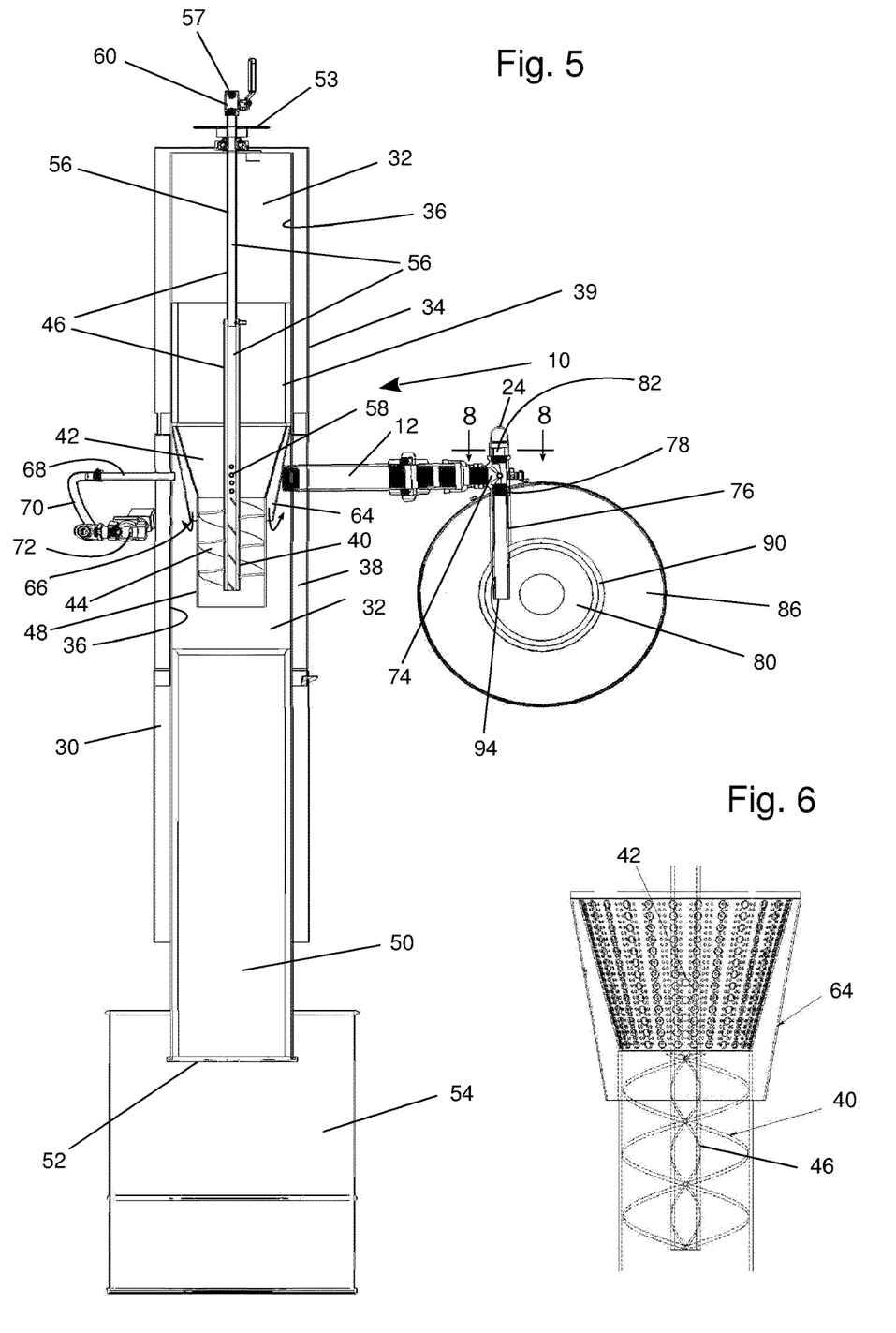
FIG. 5 is a view in vertical section of the embodiment of FIG. 1 taken substantially along the line 5-5 of FIG. 3.
FIG. 6 is an enlarged view in vertical section taken substantially along the line 5-5 of FIG. 3 showing in more detail a part of the embodiment of FIG. 1.
Figure 7:
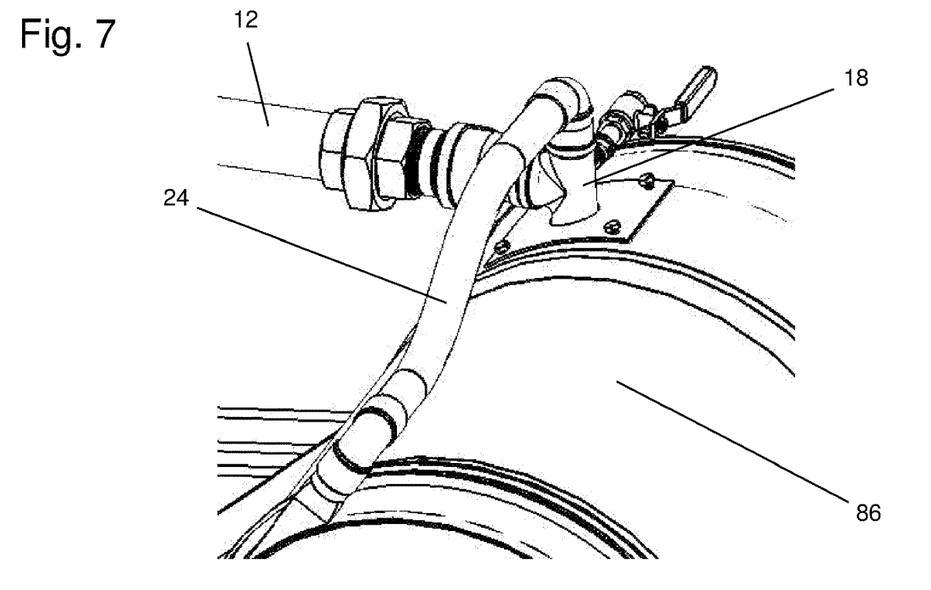
FIG. 7 is an enlarged view in perspective illustrating in more detail components of the embodiment illustrated in FIG. 1 for mixing fuel and combustion air by generating suction in a fuel mixing chamber.
Figure 8:
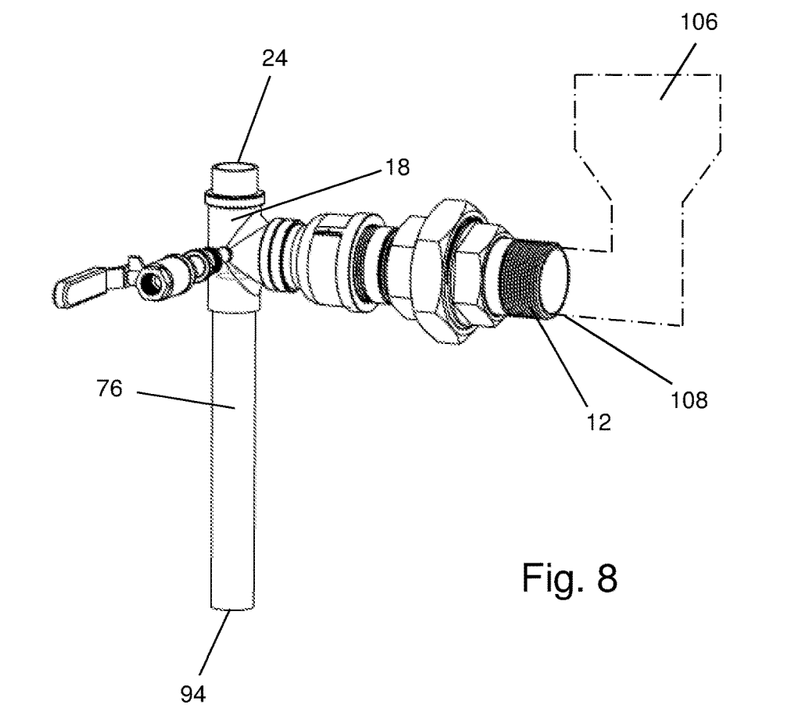
FIG. 8 is an enlarged view in perspective of the components shown in FIG. 7 and a conduit for supplying fuel and air mixture into the burner of the embodiment illustrated in FIG. 1.
Figure 9:
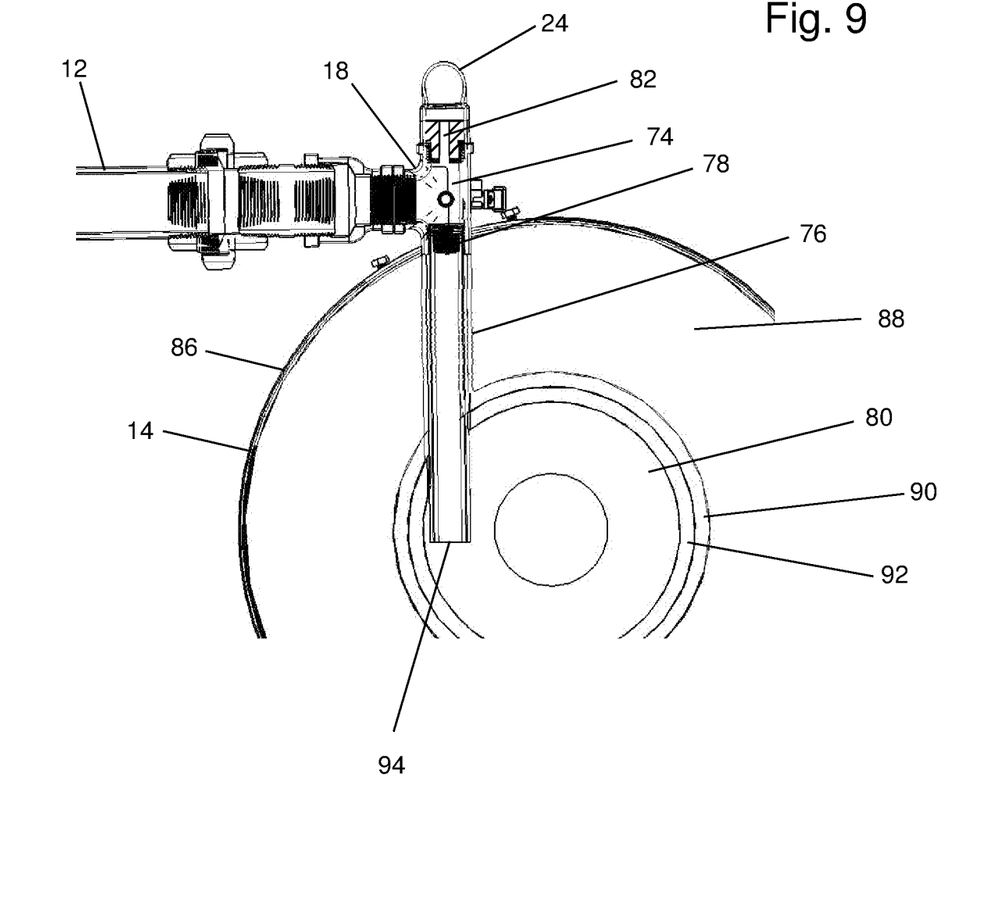
FIG. 9 is a view in vertical section taken substantially along the line 5-5 of FIG. 3 and illustrating in more detail the components illustrated in FIGS. 7 and 8.

Referring to FIGS. 1 through 6, the downdraft gasifier 10 has a vertically oriented cylindrical fire tube 30 surrounding a gasifier working chamber 32 (FIG. 5). The fire tube 30 has a tubular outer metal cover 34, a tubular inner metal sleeve 36 and thermally resistant insulation 38, such as a ceramic, interposed between the cover 34 and the sleeve 36. A cylindrical fire tube riser sleeve 39 is telescopically fit within the tubular inner metal sleeve 36.

A grate for supporting the biofuel during its processing in the processing zones is mounted within the working chamber 32. A grate is a support shelf that supports combusting materials and the products of combustion but is porous to permit the passage of gases. In the preferred embodiment of the invention that is illustrated in the drawings, the grate has two component parts: an auger 40 and a frusto-conical grate 42.

The auger 40 extends vertically through a portion of the gasifier working chamber 32 and comprises an auger screw 44 connected to a central auger shaft 46 that can rotate around a vertical, central axis of rotation. Preferably the auger 40 is a double helix auger. The frusto-conical grate 42 is mounted in the gasifier working chamber 32 and is arranged for funneling biomass onto the auger screw 44. Preferably, the upper, wider end of the frusto-conical grate 42 seats against the interior wall of the fire tube 30 to prevent the passage of biomass between them. The frusto-conical grate 42 is perforated for permitting the passage of gases through the grate 42 while supporting the biomass during its processing. Surrounding the auger screw 44 is a guide tube 48 that has an open upper end in registration with the narrower lower end of the frusto-conical grate 42.

Figures 1, 2:
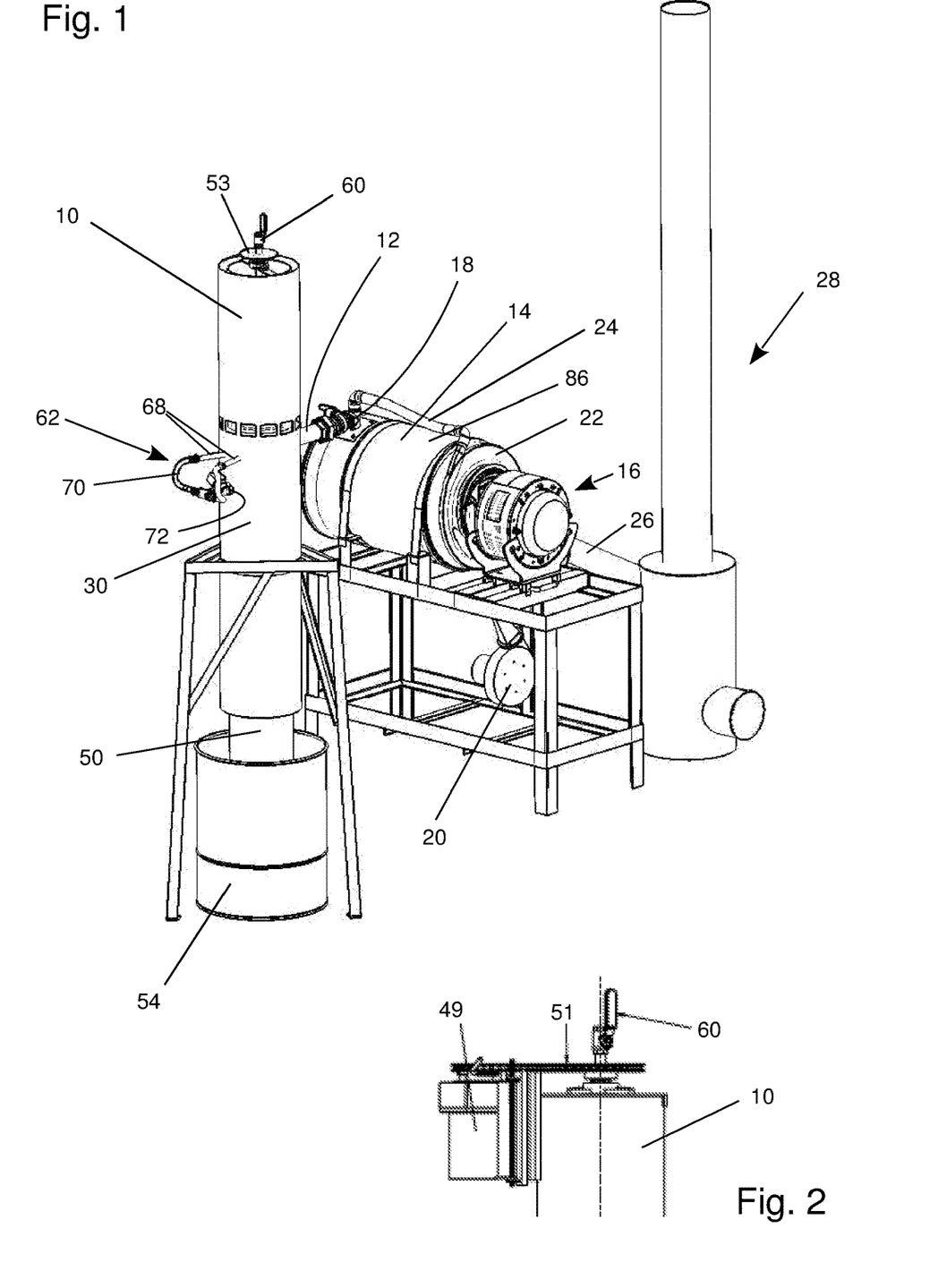
FIG. 1 is a view in perspective of an assembled embodiment of the invention.
FIG. 2 is a view in side elevation of a part of an alternative motorized drive for rotating the auger of the embodiment of FIG. 1.
Figure 3:
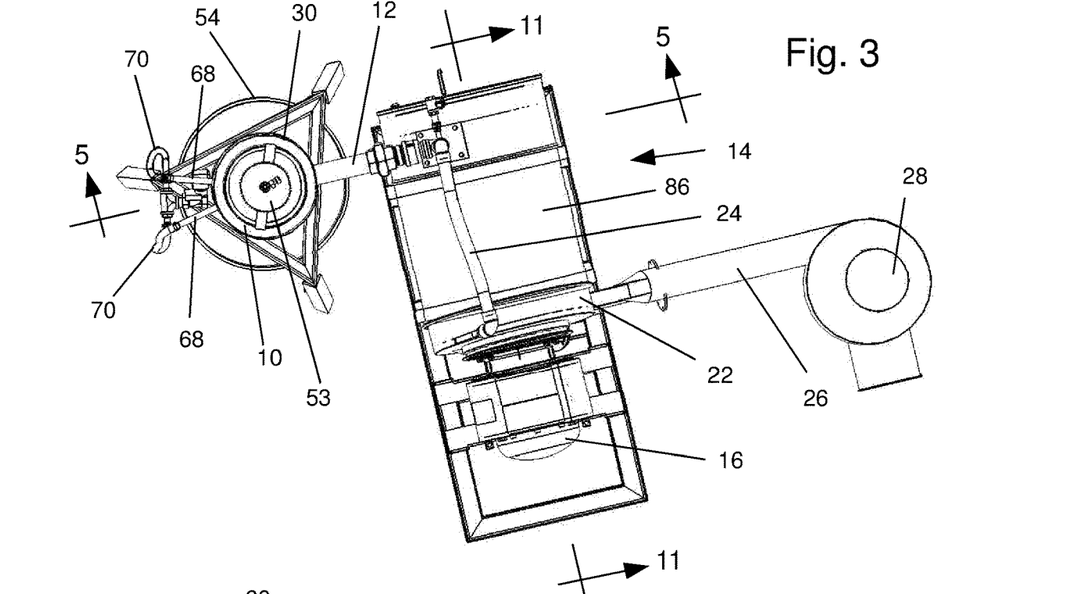
FIG. 3 is a top view of the embodiment of FIG. 1.
Figure 4:
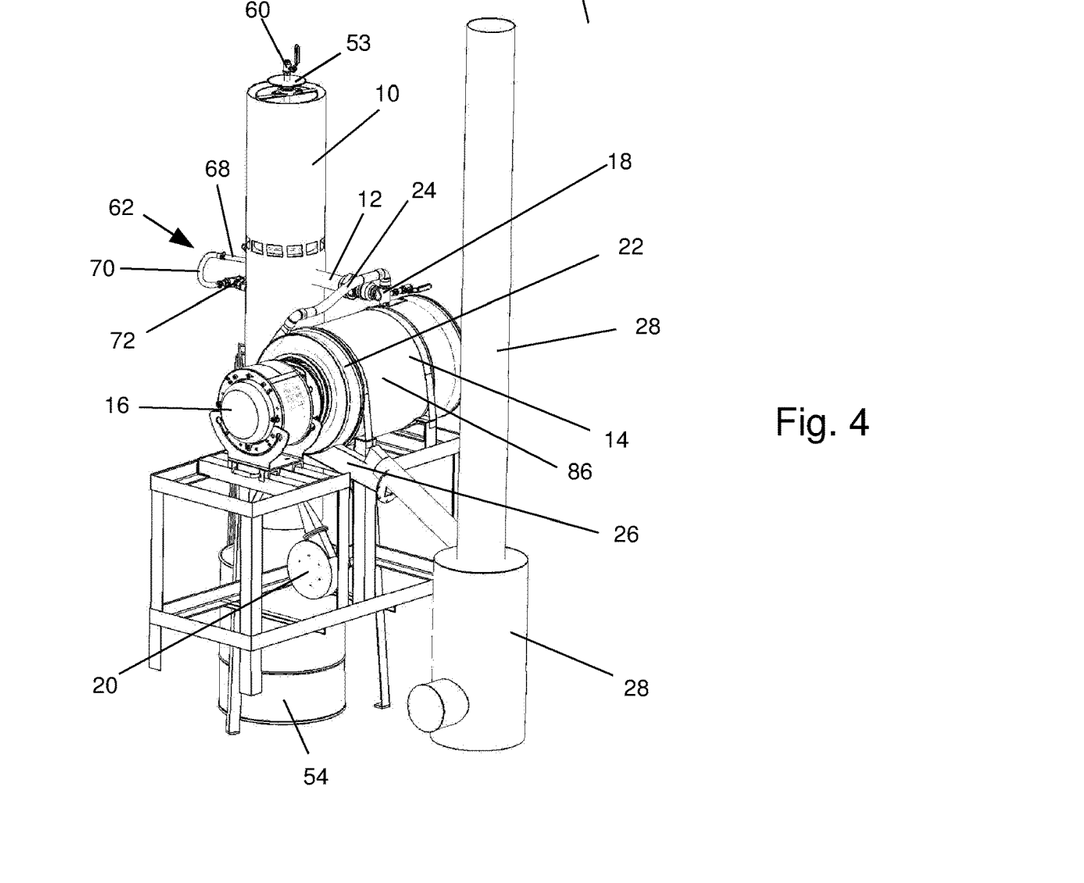
FIG. 4 is a view in perspective of the embodiment of FIG. 1 viewed from a different perspective.

Referring to FIG. 2, the auger can be manually rotated from time to time but preferably an electric motor 49 is drivingly connected through a drive chain 51 to a sprocket 53 that is fixed near the upper end of the auger shaft 46. The drive motor can be periodically or continuously operated by manual control or a programmed electronic control.

During operation of the downdraft gasifier 10, there is no precise boundary between the four processing zones and the approximate zone boundaries can vary upward or downward as a result of air supply variations and consequent temperature variations. The combustion zone is located approximately in the perforate frusto-conical grate 42 and above the top of the auger 40. The pyrolysis zone is immediately above the combustion zone and extends upward approximately through the fire tube riser sleeve 39. The drying zone is above the pyrolysis zone and the reduction zone is in the auger 40 below the combustion zone and extends downward from approximately the top of the auger 40. The auger functions as a grate in the sense that it supports the biomass during its processing and, because it contains principally biochar, it is somewhat porous so it permits some flow of gases downward through the auger guide tube 48.

The auger 40 not only functions as a grate, by supporting the biomass during its processing while minimizing obstruction of gas flow through the gasifier, but it also functions as a means of active transport for removing char from the combustion area. Upon rotation of the auger 40, biochar is moved downward and dropped from the auger 40 into a char containment riser 50 having a bottom dump door 52 closing its bottom end.

The bottom dump door 52 is movable into a position below the auger where it blocks or restricts air flow into the bottom of the fire tube 30 and retains biochar that is dropped from the bottom end of the auger 40. Preventing ambient air from being drawn into the fire tube 30 from underneath is necessary in order to maintain the flow of gases in a downward direction through the fire tube 30 and through the outlet conduit 12 as a result of the suction applied to the fuel gas outlet conduit 12 (discussed in more detail below). The dump door 52 is movable to an open position to permit collected biochar to drop into a steel biochar receptacle 54. Consequently, dump door 52 facilitates periodic removal of char from the gasifier without interrupting operation of the gasifier because the bottom of the fire tube 30 is opened for only a very short period of time to allow the collected biochar to fall from the char containment riser 50 into the biochar receptacle 54.

Because the suction applied to the fuel gas outlet conduit 12 draws gases downward through the fire tube 30, it is not necessary that the top of the fire tube be closed. Consequently, the top can be left open which facilitates easy, convenient filling of biomass into the fire tube 30 without requiring removal and replacement of a top closure. Additionally, the primary air inlet for supporting combustion of the biomass in the working chamber 32 is the open top of the fire tube 30. The suction draws ambient air down through the drying biomass and draws gasified products of pyrolysis and gasification down through the remaining processing zones. The gasified products are principally drawn out through the perforations in the frusto-conical grate 42 and down through the gap 66 between the bottom of the outer frusto-conical baffle 64 and then up through the fuel gas conduit 12.

A secondary air inlet is also provided for drawing air directly to the combustion zone for supporting combustion in the frusto-conical grate 42. For that purpose the auger shaft 46 is a tube having an inner passageway 56 extending from an upper opening 57 into the ambient atmosphere downward to at least one and preferably multiple radially bored openings 58 at the level of the combustion zone. These secondary air inlet openings 58 permit a secondary source of ambient air to be drawn downward from the upper opening 57 directly into the combustion zone for controllably increasing or decreasing combustion.

In order to permit control of the secondary air drawn into the combustion zone through the inner passageway 56 of the auger shaft 46, a valve 60 is connected between the upper opening 57 and the tubular auger shaft 46. The valve 60 is illustrated as a manually actuated valve but it can alternatively be an electrically actuated valve operated by an electronic control.

A tertiary air supply is provided to cause some combustion of the fuel gas passing out through the fuel gas conduit 12 in order to increase the temperature within the fuel gas conduit 12 sufficiently to burn off any tar that has condensed on the inner wall of the fuel gas conduit 12. The tertiary air is conducted into the gasifier working chamber 32 through at least one and preferably two air inlet tubes 68. The air inlet tubes 68 extend through the gasifier fire tube 30 and open into the space between the inner metal sleeve 36 of the fire tube 30 and the outer frusto-conical baffle 64. The air inlet tubes 68 are closely fit to the fire tube 30 for preventing gas passage between them. The air inlet tubes 68 are connected through hoses 70 to a valve 72 which opens to the ambient atmosphere. The valve 72 is manually or electrically actuated for controlling air flow through the air inlet tubes 68.

The outer, frusto-conical baffle 64 surrounds the frusto-conical grate 42 and is impervious. The baffle 64 extends downward and inward from the interior wall of the gasifier fire tube 30 to below the level of the narrower lower end of the frusto-conical grate 42. The lower end of the outer, frusto-conical baffle 64 is spaced outwardly from the guide tube 48 to provide the gap 66.

The purpose of the frusto-conical baffle 64 is to direct the incoming tertiary air flow directly to the gasifier's fuel gas outlet conduit 12. The fuel gas outlet conduit 12 extends through only the fire tube 30 and opens into the gasifier working chamber 32 outward of and higher than the lower end of the outer, frusto-conical baffle 64. Consequently, the baffle 64 is a wall or shield that guides incoming tertiary air principally around the baffle 64 directly to the fuel gas outlet conduit 12 where it is mixed into the fuel gas that passes through the fuel gas conduit 12. Mixing the tertiary air into the high temperature fuel gas causes combustion within the fuel gas conduit 12 that increases the internal temperature thereby burning off tar deposits. The tertiary air inlet arrangement is operated only intermittently for a short time period by opening the tertiary air inlet valve 72. as needed to remove any build-up of tar deposits on the interior wall of the fuel gas conduit 12. But when needed, the valve 72 is opened and ambient air is drawn in by the suction mentioned above and explained in more detail below.

The Orifice, Venturi and Suction

Gases in the downdraft gasifier 10 are at approximately atmospheric pressure. Pressure in the combustion chamber is considerably higher due to gas expansion from the heat of combustion. Consequently, there is a need to force the fuel gas into the combustion chamber.

Referring to FIGS. 5 and 7 through 11, the downdraft gasifier 10 supplies fuel gas through the fuel gas conduit 12 into a fuel inlet port of a fuel mixing conduit segment in the form of a tee 18. The conduit segment 18 houses a mixing chamber 74. The other two openings of the conduit segment 18 provide a combustion air inlet port into the mixing chamber 74 and a combustion chamber outlet port from the mixing chamber 74. A combustion air supply is connected through the combustion air conduit 24 to the combustion air inlet port of the tee 18 for forcing combustion air into the mixing chamber 74. A combustion chamber supply conduit 76 has an inlet end 78 connected to the combustion chamber outlet port of the mixing chamber 74 and extends into the combustion chamber 80 of the external combustion engine 16.

Figure 10:
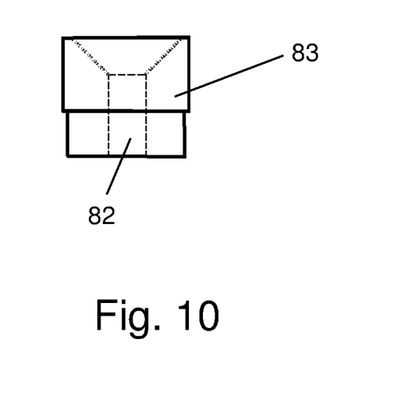
FIG. 10 is a side view of an orifice insert used in the components illustrated in FIGS. 7-9.

The combustion air supply in the preferred embodiment consists of the blower 20 and the recuperator 22 and their interconnecting conduits. Combustion air is forced under super-atmospheric pressure by the blower 20 through the recuperator 22 and the combustion air conduit 24 into the mixing chamber 74. Importantly, the combustion air supply is connected to the combustion air inlet port of the tee 18 through a restricted orifice 82 that is adjacent or just before the mixing chamber 74. Ambient air for supporting combustion in the burner 14 is forced under pressure by the blower 20 through the recuperator 22 and from the recuperator 22 through the combustion air conduit 24 and the orifice 82 into the mixing chamber 74 within the tee 18. Referring to FIG. 10, the orifice 82 is advantageously implemented by a cylindrical insert 83 that fits within pipe fittings used to form the combustion air conduit 24 at its connection to the tee 18.

Because the high velocity incoming combustion air is forced through the orifice 82 just prior to the introduction of fuel it causes a continuous suction in the mixing chamber 74 that draws the fuel gas from the downdraft gasifier 10 through the fuel gas conduit 12 and into the mixing chamber 74. The orifice 82 causes a venturi effect that generates a pressure differential, typically a sub-atmospheric pressure, in the mixing chamber. The orifice 82 has a cross-sectional area smaller than the cross-sectional area of the combustion air supply conduit and the mixing chamber. With the use of a single blower this venturi effect at the intersection of the fuel with the combustion air can support the use of various fuel types and phases in addition to fuel gas from a gasifier.

The suction resulting from the venturi effect of the orifice 82 allows the top of the gasifier 10 to be operated with the upper end of the fire tube 30 left open and avoids the need for an air tight gasifier. It is at least highly desirable and possibly necessary to have the air inlet port into the mixing chamber 74 and the combustion chamber outlet port from the mixing chamber 74 oriented with aligned central axes and the central axis of the fuel inlet port aligned transversely into the mixing chamber 74. This maximizes the venturi effect and allows the high velocity incoming air to flow along a linear path straight through the combustion chamber supply conduit 76.

The Burner

Gas fuel produced by the downdraft gasifier described above can be used for nearly any of the same purposes for which gas produced in other ways can be used. For example, the most common manner of extracting energy from a fuel gas is by combustion at or within a burner for heating another object or for simply heating an ambient environment. The gas fuel produced by the downdraft gasifier can also be used for powering internal combustion engines. The burner that will now be described is only one example, but a particularly useful example, of a use for the downdraft gasifier of the invention. However, the burner of the invention can alternatively be used not only for burning fuel gas, but also for burning liquid or solid particulate fuels.

In the illustrated embodiment of the invention the mechanical power source includes the external combustion engine 16 having its combustion chamber 80 adjacent the heat accepting component 84 of the external combustion engine 16. In the preferred embodiment the heat accepting component 84 is the head of a free-piston Stirling engine that is thermally coupled to burner 14. The burner 14 and its combustion chamber 80 have a circular cross section. The burner 14 has an outer cylindrical steel casing 86 surrounding a thick cylindrical layer of ceramic insulation 88. Within the ceramic insulation 88 there is a cylindrical riser sleeve 90 and within that a cylindrical inner liner 92 of ceramic insulation formed, for example, of alumina silica. Consequently, the combustion chamber 80 is the volume within the inner liner 92. The combustion chamber supply conduit 76 is preferably aligned parallel to a tangent of the circular cross section of the ceramic inner liner 92 that defines the combustion chamber 80. The outlet 94 of the combustion chamber supply conduit 76 is spaced outward from the center of the combustion chamber 80 and preferably close to the inner liner 92 of the combustion chamber 80. This orientation and positioning of the supply conduit 76 causes the fuel and air mixture to enter tangentially into the combustion chamber 80 to form a vortex burner.

The thermally resistant materials that form the insulation layers may include, but are not be limited to, clays, fire bricks, composites, ceramics, and/or combinations thereof. As one example, the burner outer casing 86 may be formed from a cylindrical steel drum and lined with a light weight, insulating fire brick and coated with a thin layer of high temperature ceramic material or paste to form the inner surfaces.

A bullet head shield 96 (FIG. 11) is interposed between the head 84 and the major portion of the combustion chamber 80. As is more visible in the enlarged view of FIG. 12, a gap 98 is formed between the peripheral rim 97 of the shield 96 and the inner surface of the recuperator 22 that borders the combustion chamber 80. This gap 98 is designed to maximize mass heat flow to the engine heater head by allowing hot combustion gases to enter within the shield 96 and contact the head 84 in order to optimize engine's performance.

The heat recuperator 22 is a heat exchanger that transfers heat from hot exhaust combustion gases to incoming air for supporting combustion. It is located adjacent the opposite end of the combustion chamber 80 from where the fuel and combustion air mixture enters at high velocity through the supply conduit 76. Combustion gases exit the combustion chamber 80 through the recuperator 22 along a path shown by the arrows shown in FIGS. 11 and 12 and then pass out of the recuperator 22 through an exhaust conduit 26.

Figures 11, 12, 13:
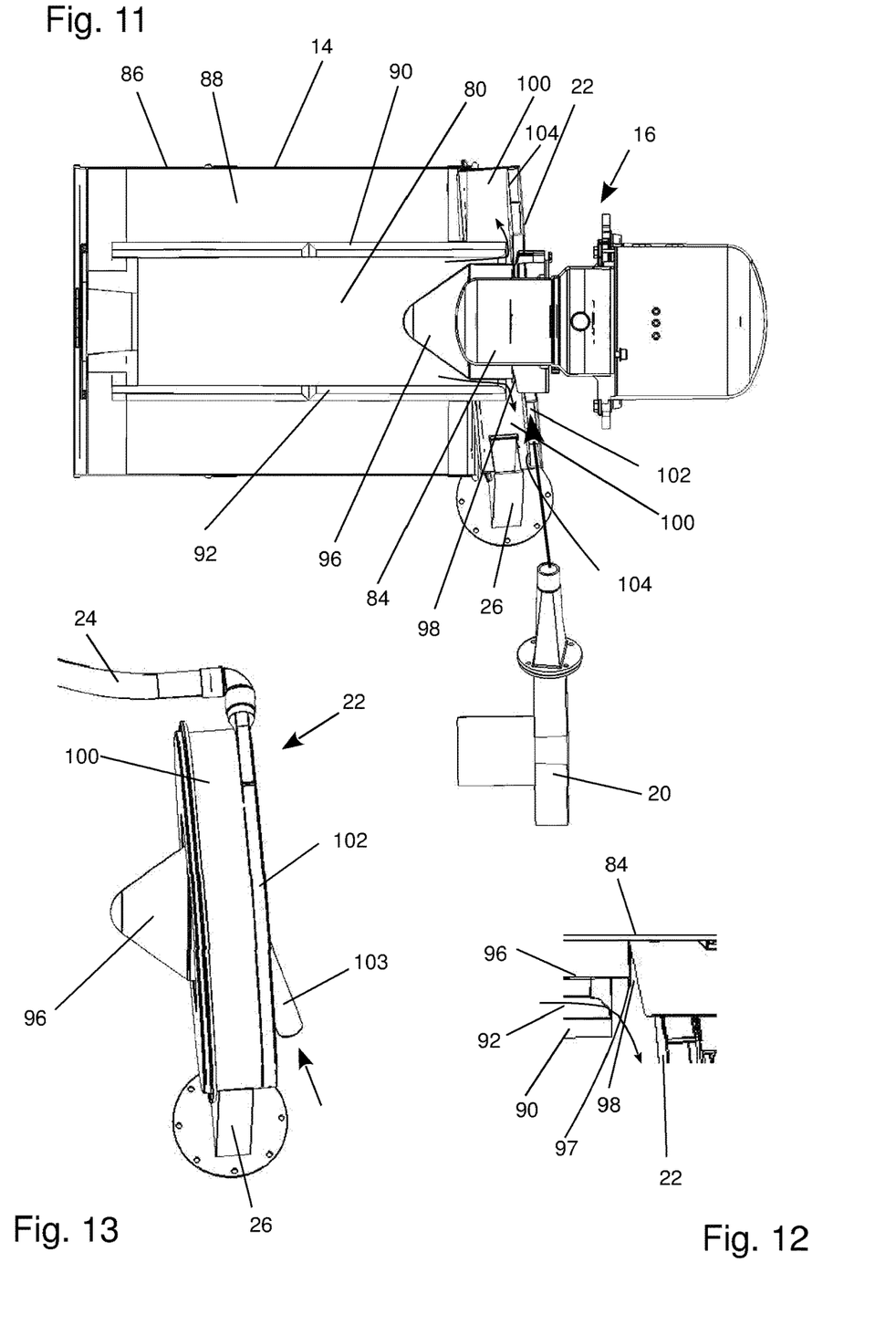
FIG. 11 is a view in vertical section taken substantially along the line 11-11 of FIG. 3.
FIG. 12 is a greatly enlarged view of a portion of FIG. 11.
FIG. 13 is a side view of the recuperator of the embodiment illustrated in FIG. 1.

Referring particularly to FIGS. 11 and 13, the recuperator 22 has two, side by side, coaxial chambers 100 and 102 that surround the FPS engine 16 and have an impervious common wall 104 between them. One recuperator chamber is an annular first passageway 100 through which hot combustion gases flow to and out the exhaust conduit 26. The second chamber is a second annular passageway 102 that is axially adjacent the first passageway 100 and is interposed in the combustion air supply conduit between the blower 20 and the mixing chamber 74. Combustion air enters the second passageway 102 from the blower 20 through an inlet conduit 103. The first passageway 100 and the second passageway 102 are separated by the impervious common wall 104 that interfaces the two passageways 100 and 102. The superheated combustion gases pass along the arrows in FIG. 11 through the gap between the engine heater head 84 and the burner inner liner 92 and then flow against the common wall 104 of the recuperator 22.

In that way the recuperator 22 transfers heat from the outgoing gas products of combustion within the burner 14 into the incoming combustion air from the blower 20 as the combustion air flows to the mixing chamber. Preheating the combustion air and the fuel gas from the gasifier 10 by means of the recuperator 22 substantially improves the efficiency of the generation of heat from combustion in the combustion chamber. Spiral guide fins are preferably mounted within the second passageway 102 for guiding the incoming combustion air along a spiral path within the passageway 102 in order to further increase heat transfer efficiency.

As the superheated exhaust gas from burner 20 transfers heat to the ambient inlet combustion air, the exhaust gas cools enough to allow for a simply designed, thin carbon steel exhaust enclosure. This reduced exhaust temperature minimizes any material distortion and/or failure that would result at higher exhaust temperatures.

The burner with its external combustion engine that is described above is not limited to use with a gasifier and is not limited to the use of fuel gas. The vortex burner 14 is particularly effective for burning solid fuels because it allows for complete combustion of such fuels at high temperatures. The burner 14 when combined with the above-described mixing chamber that utilizes the venturi effect to create a low-pressure suction can also be used for burning solid particulate fuels. Solid particulate fuels, such as some kinds of sufficiently small wood pellets or chips can be fed into the mixing chamber. This alternative use is illustrated diagrammatically in FIG. 8. The fuel supply can comprise a hopper 106 for containing biomass particles. The hopper 106 has a hopper outlet 108 connected to the fuel inlet port of the fuel mixing conduit segment or tee 18 in place of the fuel gas conduit 12 for supplying biomass particles into the mixing chamber. With this configuration the high velocity air forced through the mixing chamber 74 creates the low pressure suction that draws solid fuel particles into the mixing chamber 74 and carries them through the supply conduit 76 into a vortex formed in the combustion chamber 80.

For use in burning gas or liquid fuels, the burner of the invention can be used with the central axis of its combustion chamber 80 in a horizontal or vertical orientation. However, for burning particulate fuels it is preferably positioned with that axis in a horizontal orientation.

Operational testing of the preferred embodiment of the invention has shown that it removes all of the combustible tars and gases. The tars are outgassed and are conveyed with the fuel gases into the combustion chamber where they are combusted at high temperatures within the combustion chamber.

An additional benefit of the invention is that is produces a biochar that is very valuable to organic farmers. The charcoal coming out the bottom from the auger 40 has very little tar and only a small amount of ash making it suitable for mixture into the soil. Charcoal is known to be very adsorbent. In prior art gasifiers, as gases move down from the pyrolysis zone and through the reduction zone, the tars and gases can be adsorbed by the charcoal. However, experimental operation has shown that, with the invention, the temperature in the reduction zone is sufficiently high that significant adsorption does not occur.

LIST OF COMPONENT PARTS BY REFERENCE NUMBERS downdraft gasifier 10
fuel gas conduit 12
burner 14
free-piston Stirling engine 16
fuel mixing conduit segment—tee 18
blower 20
recuperator 22
combustion air conduit 24
exhaust conduit 26
cyclonic separator 28
fire tube 30 gasifier working chamber 32
fire tube outer cover 34
inner metal sleeve 36
fire tube insulation 38
fire tube riser sleeve 39
auger 40
frusto-conical grate 42
auger screw 44
auger shaft 46
auger guide tube 48
electric motor 49
char containment riser 50
drive chain 51
bottom dump door 52
sprocket 53
steel biochar receptacle 54
auger shaft inner passageway 56
upper secondary air inlet opening 57
secondary air inlet openings 58
secondary air valve 60
tertiary air inlet 62
outer frusto-conical baffle 64
gap 66
tertiary air inlet tubes 68
tertiary air inlet hoses 70
tertiary air inlet valve 72
mixing chamber 74
combustion chamber supply conduit 76
combustion chamber supply conduit inlet end 78
combustion chamber 80
restricted orifice 82
orifice insert 83
heat accepting component (e.g. FPSE head) 84
burner outer casing 86
burner insulation 88
burner riser sleeve 90
burner inner layer of ceramic insulation 92
burner supply conduit outlet 94
bullet head shield 96
shield's peripheral rim 97
gap 98
recuperator's first passageway for exhaust gases 100
recuperator's second passageway for air 102
air inlet conduit to recuperator 103
recuperator's common wall 104
hopper 106
hopper outlet 108

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also encompassed within the spirit and scope of the invention and that various modifications may be adopted without departing from the invention or scope of the following claims.

The invention claimed is:

1. A mechanical power source comprising a fuel-supplying gasifier and a burner with a combustion chamber having a circular cross section formed by a ceramic insulation interior wall, the mechanical power source comprising:

(a) a conduit segment housing a mixing chamber having a fuel inlet port connected to a fuel outlet of the gasifier, a combustion air inlet port and a combustion chamber outlet port;

(b) a combustion air supply including a blower connected to deliver air at super-atmospheric pressure into the mixing chamber, the combustion air supply connected to the air inlet port of the mixing chamber through a restricted orifice adjacent the mixing chamber for generating a pressure in the mixing chamber less than the fuel supply pressure;

(c) a combustion chamber supply conduit having an inlet end connected to the combustion chamber outlet port and extending into the combustion chamber aligned parallel to a tangent of the circular cross section and having an outlet spaced nearer one end of the combustion chamber and spaced from the center of the circular cross section to form a vortex burner;

(d) an external combustion engine having said combustion chamber adjacent a heat accepting component of the external combustion engine; and (e) a thermal energy recuperator located at an end of the combustion chamber that is opposite from the combustion chamber supply conduit, the recuperator having a first passageway through the recuperator through which combusted gas flows and a second passageway through the recuperator that is interposed in the combustion air supply conduit, the first and second passageways being side by side, coaxial chambers imperviously separated by a common wall for conducting heat from exiting combusted gas to incoming combustion air as the combustion air flows to the mixing chamber.

2. A mechanical power source in accordance with claim 1 wherein the air inlet port and the combustion chamber outlet port have aligned central axes that are transverse to a central axis of the fuel inlet port.

3. A mechanical power source in accordance with claim 1 wherein the fuel supply comprises a hopper for containing biomass particles, the hopper having a hopper outlet connected to the fuel inlet port for supplying biomass particles into the mixing chamber.

4. A mechanical power source in accordance with claim 1 wherein the fuel supply comprises the gasifier, the gasifier comprising a downdraft gasifier having a fire tube surrounding a gasifier working chamber, a grate within the gasifier working chamber for supporting burning biomass and a fuel gas outlet connected through a thermally insulated conduit to the fuel inlet port of the mixing chamber, the gasifier chamber including a combustion zone above a reduction zone, the grate of the downdraft gasifier further comprising: an auger extending through a portion of the gasifier working chamber and comprising an auger screw connected to a central auger shaft having a central axis of ration, an upper end of the auger screw positioned in a region between the combustion zone and the reduction zone, the auger screw extending from its upper end downward into the reduction zone.

5. A biomass fueled mechanical power source according to claim 1 wherein the mixing chamber is formed by a tee and the fuel gas outlet from the gasifier is connected through the fuel conduit to an inlet port of the tee that is at right angles to the flow direction of the combustion air into the combustion chamber.

6. A mechanical power source in accordance with claim 1 wherein the external combustion engine is a free-piston Stirling engine and the first and second side by side passageways surround the Stirling engine.

7. A mechanical power source in accordance with claim 6 and further comprising spiral guide fins mounted within the second passageway for guiding the incoming combustion air along a spiral path within the second passageway.

* * * * *

UNITED STATES PATENT AND TRADEMARK OFFICE
CERTIFICATE OF CORRECTION

| | | |
|---|---|---|
| PATENT NO. | : 11,168,272 B2 | Page 1 of 1 |
| APPLICATION NO. | : 16/720996 | |
| DATED | : November 9, 2021 | |
| INVENTOR(S) | : Catherine J. Chagnot | |

It is certified that error appears in the above-identified patent and that said Letters Patent is hereby corrected as shown below:

In the Claims

Column 12, Claim 4, Line 53 delete the word "ration" and insert --rotation-- in its place.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*